US00RE37456B1

(19) United States
(12) Reissued Patent
Brisson

(10) Patent Number: US RE37,456 E
(45) Date of Reissued Patent: Nov. 27, 2001

(54) DEVICE TO MONITOR THE CONTENT AND/OR DISPLAY OF MESSAGES

(75) Inventor: Pierre Brisson, Meyrargues (FR)

(73) Assignee: STMicroelectronics S.A., Gentilly (FR)

(21) Appl. No.: 09/025,396

(22) Filed: Feb. 18, 1998

Related U.S. Patent Documents

Reissue of:
(64) Patent No.: 4,916,731
Issued: Apr. 10, 1990
Appl. No.: 07/246,998
Filed: Sep. 20, 1988

U.S. Applications:

(63) Continuation of application No. 08/320,493, filed on Oct. 7, 1994, now abandoned, which is a continuation of application No. 07/866,005, filed on Apr. 9, 1992, now abandoned.

(30) Foreign Application Priority Data

Sep. 28, 1987 (FR) ..... 87 13353

(51) Int. Cl.[7] ..... H04M 11/00
(52) U.S. Cl. ..... 379/93.22; 379/144
(58) Field of Search ..... 379/90.01, 91.01, 379/92.04, 93.12–93.13, 93.17, 93.22–93.23, 110.01, 144, 150, 453; 364/464.28, 705.01, 705.05, 705.08–705.09; 235/380–382, 375; 902/26; 434/308

(56) References Cited

U.S. PATENT DOCUMENTS

| | | | | |
|---|---|---|---|---|
| 2,957,940 | * | 10/1960 | Cusano | 358/60 |
| 4,028,733 | | 6/1977 | Ulicki | 360/10 |
| 4,071,697 | | 1/1978 | Bushnell et al. | 179/2 TV |
| 4,159,417 | * | 6/1979 | Rubincam | 235/375 |
| 4,367,402 | | 1/1983 | Giraud et al. | 235/385 |
| 4,370,649 | * | 1/1983 | Fuerle | 379/96 |
| 4,439,636 | | 3/1984 | Newkirk et al. | 179/7.1 R |
| 4,544,835 | | 10/1985 | Drexler | 235/487 |
| 4,577,061 | * | 3/1986 | Katzeff | 379/144 |
| 4,621,188 | | 11/1986 | Stockburger et al. | 235/382 |
| 4,634,809 | | 1/1987 | Paulsson et al. | 379/91 |
| 4,639,225 | * | 1/1987 | Washizuka | 434/308 |
| 4,719,338 | | 1/1988 | Avery et al. | 235/380 |
| 4,764,666 | * | 8/1988 | Bergeron | 235/380 |
| 4,778,983 | * | 10/1988 | Ushikubo | 235/381 |
| 4,789,863 | | 12/1988 | Bush | 340/825.35 |
| 4,797,914 | | 1/1989 | Vaello | 379/96 |
| 4,803,348 | | 2/1989 | Lohrey et al. | 235/381 |
| 4,812,629 | * | 3/1989 | O'Neil et al. | 235/383 |
| 4,861,971 | * | 8/1989 | Chan | 235/381 |
| 4,879,744 | * | 11/1989 | Tasaki et al. | 379/144 |
| 4,897,865 | | 1/1990 | Canuel | 379/91 |
| 5,023,904 | | 6/1991 | Kaplan et al. | 379/91 |

FOREIGN PATENT DOCUMENTS

| | | | | |
|---|---|---|---|---|
| 275545 | * | 5/1951 | (DE) . | |
| 3512005 | * | 10/1986 | (DE) | 379/144 |
| 275645 | * | 5/1951 | (DE) | G09F/15/00 |
| 0196526 | * | 10/1986 | (EP) . | |
| 0058368 | * | 3/1986 | (JP) | 379/453 |
| 61-58386 | * | 3/1986 | (JP) | 379/453 |

OTHER PUBLICATIONS

Weinstein, Stephen B., "Smart Credit Cards: the Answer to Cashless Shopping", IEEE Spectrum Feb., 1984.*
Robert McIvor, "Smart Cards", *Scientific American*, Nov., 1985, vol. 253, pp. 152–159.
John Wiley & Sons, "Smart Cards: Principles, Practice, Applications", 1988, pp. 21–47, 113–123, and 163–164.
Electronic Cash Payments On The Cards, New Scientist, p. 482 (Feb. 14, 1980).

* cited by examiner

*Primary Examiner*—Curtis A. Kuntz
*Assistant Examiner*—George Eng
(74) *Attorney, Agent, or Firm*—Theodore E. Galanthay; Lisa K. Jorgenson; Sidley & Austin

(57) ABSTRACT

The period for which advertisements are displayed on display screens is monitored by coupling the displaying time with the time of a telephone call from a public telephone booth near the display panel. Preferably, the call made from this booth is paid with a pre-payment memory card. This memory card also has a memorizing zone in which it is possible to record an advertisement which is precisely the advertisement to be displayed.

37 Claims, 1 Drawing Sheet

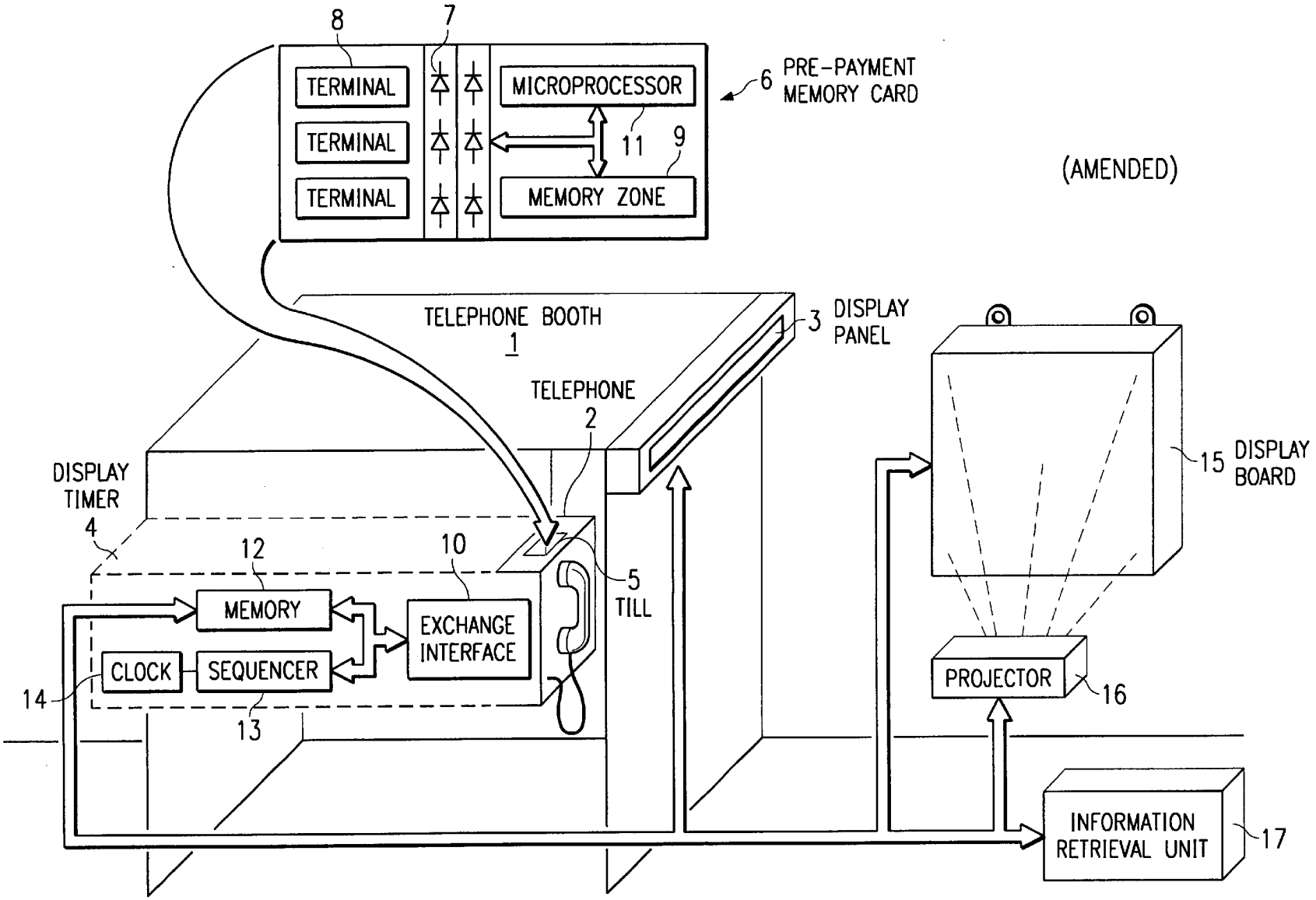
(AMENDED)
PRE-PAYMENT MEMORY CARD
6
MICROPROCESSOR
11
MEMORY ZONE
9
7
TERMINAL
TERMINAL
TERMINAL
8
TELEPHONE BOOTH
1
DISPLAY PANEL
3
TELEPHONE
2
5
TILL
DISPLAY BOARD
15
PROJECTOR
16
INFORMATION RETRIEVAL UNIT
17
EXCHANGE INTERFACE
10
MEMORY
12
SEQUENCER
13
CLOCK
14
DISPLAY TIMER
4

DEVICE TO MONITOR THE CONTENT AND/OR DISPLAY OF MESSAGES

Matter enclosed in heavy brackets [ ] appears in the original patent but forms no part of this reissue specification; matter printed in italics indicates the additions made by reissue.

*This is a continuation reissue patent application of U.S. Ser. No. 08/320,493 filed Oct. 7, 1994 now abandoned, which is a continuation of U.S. Ser. No. 07/866,005 filed Apr. 9, 1992, now abandoned. The entire disclosure of pending application U.S. Ser. No. 08/320,493 is incorporated herein by reference.*

BACKGROUND OF THE INVENTION

1. Field of the Invention

An object of the present invention is a device to monitor the content and/or duration of the display of advertisements. It can be applied in active types of display, notably when the display is done through electrical or electronic display devices.

2. Description of the Prior Art

The problems related to the displaying of advertisements are well known. An advertiser signs a contract with a hoardings company by virtue of which the advertising or display panels belonging to the company display, for a pre-determined time, advertisements praising the merits of the products manufactured or marketed by this advertiser. At the end of the contract, the advertisements are replaced by advertisements from other advertisers. When the hoardings are designed to take posters, one simply sticks a poster for the products of an advertiser on top of a previous advertisement. This handling task is difficult to manage. It requires a great number of workmen who have to be regularly sent to the hoardings to change the posters on them.

Other improved methods of display are known. In these methods, the board has a mechanism to invert the posters shown to the public. The principle of this mechanism is based on the use of two cylinders, placed on either side of the panel, used to show the public various posters relating to different advertisements in succession through a window made in this panel. The posters are wound one after the other alternately on each of the cylinders. The mechanism may even be designed to display each poster for a relatively short period, for about 15 seconds, so as to draw the attention of bystanders. Psychologically, the removal of a poster and its replacement by another one constitutes a little mystery which instinctively attracts attention.

In this system of display, however, there is no real check on the duration of the display. For the duration of the display is quite simply shared, possibly in an unequal way, among the various advertisers who have subscribed to the display of their products through this method of display. When their contract of hire is over, the cylinders or rollers have to be dismantled and the strip containing the various advertisements wound around it have to be removed. This strip is then replaced by another strip of advertisements corresponding to advertisements paid for by other advertisers. In practice, the intervals at which the content of the rollers is modified is the same as the intervals at which posters are stuck onto hoardings: often about one week. This modification too entails difficult handling operations.

An object of the invention is to overcome these handling problems while proposing a display system which can provoke the interest of bystanders through the appearance and disappearance of the displayed messages. According to the principle of the invention, the period for which a poster is displayed on a hoarding or display panel is linked to the duration of a telephone communication between two participants, at least one of whom is in a public telephone booth near this display panel. According to a preferred approach, the telephone booth has a telephone with a till to take an electronic pre-payment card and is further provided with means to tap information stored in additional memory zones of these cards and to display this information on a display panel which is functionally linked to this telephone booth. This display panel may be an integral part of the booth.

SUMMARY OF THE INVENTION

An object of the invention, therefore, is a device to monitor the content and/or duration of the display of advertisements, comprising a public telephone, a display panel connected to this telephone and means to display a message on the display panel according to the duration of the telephone communication from this telephone.

BRIEF DESCRIPTION OF THE DRAWINGS

The invention will be better understood from the following description and the accompanying FIGURE. This FIGURE is given purely as an indication and in no way restricts the scope of the invention. The single FIG. 1 shows a device, according to the invention, to monitor the duration of the display of advertisements.

DESCRIPTION OF A PREFERRED EMBODIMENT

A public type of telephone booth 1 has a telephone 2. A display panel 3 is functionally connected to the telephone 2. The device of the invention has means 4 so that the display time of a message on the panel 3 depends on the duration of a telephone communication with the telephone 2. In a preferred way, the telephone 2 has a till 5 to enable the insertion of a pre-payment electronic card 6. This card 6 has pre-payment units 7. To set off the countdown of the units used, the card 6, known as a memory card or an electronic chip card, has terminals such as 8 providing access to its memory. The memory of this card has memory zones where the pre-payment units 7 are programmed. The telephone set 2 has an exchange interface 10 of a standard type with the pre-payment memory card 6 to set off the countdown operation.

In a preferred way, the memory card 6 may also have another memorizing zone 9 to contain an advertisement. The interface 10 may be improved, in telephone sets fitted for this purpose, to provide transmission of the message contained in the zone 9 to the display panel 3. In this case, this panel 3 is of the active type. It has, for example, all the functions of a normal display panel. The card 6 may also have a microprocessor 11 so as to manage the transmission, to a memory 12 of the station 2, of information contained in the memorizing zone 9 of the card 6. Using the memory 12, it is also possible to display the information contained in this memory on the active panel 3.

In a preferred way, the telephone set 2 further has a sequencing circuit 13 to organize, in a period of time, the display of information contained in the memory 12 on the panel. The sequencing circuit essentially takes into account the duration for which a call is exchanged using the card 6 as a pre-payment means. It can simply measure this duration by counting the number of pre-payment units which have been de-programmed from the memory card 6. The sequencing circuit 13 may then compute a period of display which is equal, but is preferably rather proportionate, to the duration for which the card 6 is inserted in the telephone set 2. This sequencer may have a function for the intermittent display during short intervals, for example of about 15 seconds each, of a message contained in the memory 12.

When the booth 1 is used by several successive users, the sequencer 13 and the memory 12 can be organized so as to take into account all the advertisements corresponding to the various cards which have been inserted therein and which, of course, may be different. In this case, the sequencer 13 may organize a temporal multiplexing of the displays of these advertisements. In a preferred way, the multiplexer 13 is linked with a clock 14 which can be further used to modify the multiplexing conditions depending on the time of day. For example, the display may be off at night and may be modified at a faster rate during peak hours when there are lots of bystanders in front of the display panel.

The display panel 3 may be installed in the booth 1. As an alternative, it may be replaced by a panel 15 fixed on a support which may be, if necessary, at quite a distance from the booth 1. Although the memory capacity of the additional memories 9 of the pre-payment card 6 is presently rather limited, there is nothing to prevent the information contained by these memories 9 from representing a picture to be shown on a panel 15. In this case, to be capable of showing these pictures, the board 15 may be provided with an organized and very large number of display elements with commutable luminosity. For example, the panel 15 may be a so-called plasma panel. The panel 15 may also be a white screen on which is projected, from a place facing it, the picture representing the advertisements to be displayed. The projection device 16 may, for example, have a device to illuminate a plate of liquid crystal cells, the image of which is then projected on to the screen 15 by passing through a Schlieren lens. The projection device may also be of the type known under the brand name "Eidophore". The choice of a projection device is preferable because it protects the system from vandals. Moreover, rather than containing the entire message to be displayed, the memory zones of the card may contain only one access key to provide access to an information retrieval unit 17 connected to the booth 1. The information retrieval unit 17, which may also be of the telemetric type, could then send messages to the device 16. Thus, the information retrieval unit provides for monitoring the message displayed. The period of display is always linked to the telephone call.

A system of this type gets rid of the operations for handling the posters. Furthermore, when the memory card is used as an access key, the advertiser may change the content of these messages over a period of time without having to take any action with respect to the content of these cards.

What is claimed is:

1. A device to display advertisements, comprising a public telephone, a display panel connected to the public telephone, means [to display] *for displaying* a message on the display panel depending on the duration of a telephone communication, means so that the public telephone is accessible by an electronic pre-payment means, said pre-payment means comprising a memorizing zone, and said device comprising means [to retrieve] *for retrieving* an advertisement to be displayed in accordance with information contained in [this] *said* memorizing zone.

2. A device according to claim 1 wherein the pre-payment means [is] *comprises* a card.

3. A according to claim 2 wherein the pre-payment card comprises an integrated circuit with [a] *said* memorizing zone and wherein the device has means [to retrieve] *for retrieving* the advertisement to be displayed from [this memory] *the memorizing* zone.

4. A device according to claim 1 wherein [the] *said* means [to retrieve] *for retrieving* the advertisement [comprise] *comprises* a telephonic information retrieval unit *for storing an advertisement which is sent from the information retrieval unit to the display panel.*

5. A device according to any of the claims 1 to 3 comprising means [to sequence] *for sequencing* displays relating to different advertisements during different telephone calls.

6. A device according to claim 5 wherein [the] *said* sequencing means comprise means [to memorize] *for storing* advertisements, a clock, and means [to display the memorized] *for displaying the stored* advertisements at certain times of the day.

7. A device according to any of the claims 1 to 3 wherein the *public* telephone [set has] *includes* means [to memorize] *for memorizing* the advertisements retrieved.

8. A device according to any of the claims 1 to 3 wherein the display [device] *panel* comprises projection means.

*9. An apparatus for use with a memory-type user card having a memory zone for storing display matter and pre-payment units, said apparatus comprising:*

*said memory-type user card being of the type in which the display matter does not change during use of the user card;*

*a visual display;*

*an interface for reading the user card to determine a number of pre-payment units used;*

*a reader for reading display matter from the user card;*

*means for displaying a message on said visual display in accordance with the display matter read from the memory zone of the user card; and*

*wherein said interface enables the apparatus to display a message for a time period, said time period depending upon the number of pre-payment units used.*

*10. An apparatus according to claim 9, further comprising a memory unit for storing at least one full text message therein, and said user card memory zone includes a key which is cross-referenced to a full text message in the memory unit, wherein after cross referencing the user card memory zone key to the full text message in the memory unit, a cross-referenced full text message is read from the memory unit and displayed on the visual display.*

*11. An apparatus according to claim 9, further comprising a microprocessor for transferring video data from the user card memory zone to a memory unit of the apparatus, and therefrom to the visual display.*

*12. An apparatus according to claim 9, wherein said visual display is located remote from the apparatus.*

*13. An apparatus according to claim 9, further comprising a sequencer for coordinating display of a plurality of messages in the period of time.*

*14. An apparatus according to claim 9, wherein said apparatus is associated with a telephone booth.*

*15. An apparatus according to claim 9, further comprising an information retrieval memory which stores a message that is accessible by said apparatus in response to a key stored in the user card memory zone, wherein the means for displaying is adapted for accessing a message in the information retrieval memory and for sending a message to the visual display.*

*16. An apparatus according to claim 9, wherein the reader comprises a microprocessor located on the user card.*

*17. A device for displaying messages, comprising:*

*a telephone adapted for use with a memory-type user card;*

*said memory-type user card having a first storage zone for storing therein pre-payment units, and a second storage zone for storing therein information;*

*a machine that is accessed when a telephone call is made via said telephone using said memory-type user card;*

*said machine including means for reading said information stored in said second storage zone of the user card;*

*a display panel associated with said machine;*

*a sequencer a) for computing a period of time as a function of pre-payment units, b) for organizing a message in accordance with the information read from the user card, and c) for causing display of said message only in said period of time and only for the duration of use of the memory-type user card with said telephone; and*

*means for displaying the message.*

*18. A device according to claim 17, further comprising a memory unit for storing at least one full text message therein, and said user card second storage zone includes a key which is cross-referenced to a full text message in the memory unit, wherein after said device cross references the user card second storage zone key to the full text message in the memory unit, the cross-referenced full text message is read from the memory unit and displayed on the display panel.*

*19. A device according to claim 17, further comprising a processor for transferring video data from the user card second storage zone to a memory unit of the device, and therefrom to the display panel.*

*20. A device according to claim 17, wherein said display panel is located remote from the device.*

*21. A device according to claim 17, wherein the sequencer is adapted for coordinating display of a plurality of messages in the period of time.*

*22. A device according to claim 17, further comprising an information retrieval memory which stores a message that is accessible by said device in response to a key stored in the user card second storage zone, wherein the sequencer accesses a message in the information retrieval memory and sends the message to the display panel.*

*23. A device according to claim 17, further comprising an interface for using the user card to determine a number of pre-payment units used, and based on the number of pre-payment units used, computing said period of time.*

*24. A device to display advertisements, comprising a public telephone, a display panel connected to the public telephone, means for displaying a message on the display panel, means for receiving an electronic pre-payment means, said pre-payment means comprising a memorizing zone, means for retrieving an advertisement to be displayed in accordance with information contained in the memorizing zone and means for sequencing displays relating to different advertisements during different telephone calls.*

*25. A device according to claim 24 wherein said sequencing means comprises means for storing advertisements, a clock, and means for displaying the stored advertisements at certain times of the day.*

*26. An apparatus for use with a memory-type user card having a memory zone for storing advertising matter and pre-payment units, said apparatus comprising:*

*a visual display;*

*an interface for reading the user card and decrementing a number of pre-payment units therefrom;*

*a reader for reading advertising matter from the user card;*

*means for displaying an advertisement on said visual display in accordance with the advertising matter read from the memory zone of the user card; and*

*wherein said interface enables the apparatus to display the advertisement as a function of the number of pre-payment units decremented from the user card.*

*27. An apparatus according to claim 26, further comprising a memory unit for storing at least one full text advertisement therein, and said user card memory zone includes a key which is cross-referenced to a full text advertisement in the memory unit, wherein after said apparatus cross references the user card memory zone key to the full text advertisement in the memory unit, the cross referenced full text advertisement is read from the memory unit and displayed on the visual display.*

*28. An apparatus according to claim 26, further comprising a processor for transferring advertising video data from the user card memory zone to a memory unit of the apparatus, and therefrom to the visual display.*

*29. An apparatus according to claim 26, wherein said visual display is located remote from the apparatus.*

*30. An apparatus according to claim 26, further comprising a sequencer for computing a period of time as a function of the pre-payment units decremented, and for coordinating display of a plurality of advertisements in the period of time.*

*31. An apparatus according to claim 26, wherein said apparatus is associated with a telephone booth.*

*32. An apparatus according to claim 26, further comprising an information retrieval memory which stores an advertisement that is accessible by said apparatus in response to a key stored in the user card memory zone, wherein the means for displaying accesses an advertisement in the information retrieval memory and sends the advertisement to the visual display.*

*33. An apparatus according to claim 26, wherein the reader comprises a microprocessor located on the user card.*

*34. A device for displaying advertisements, comprising:*

*a public telephone;*

*a machine connected to the public telephone that is accessible for use with a memory-type user card which has a memory zone therein for storing information including a key, said machine comprising means for reading said information stored in said memory zone of the user card and a memory unit for storing at least one full text advertisement therein which is cross-referenced to the key in the memory zone;*

*a display panel associated with said machine; and*

*means for displaying an advertisement on said display panel in accordance with the information read from the user card wherein after cross referencing the user card memory zone key to the full text advertisement in the memory unit, the cross referenced full text advertisement is read from said memory unit and is displayed on the display panel.*

*35. A device according to claim 34, further comprising an information retrieval memory which stores an advertisement that is accessible by said device in response to a key stored in the user card memory zone, wherein the means for displaying accesses an advertisement in the information retrieval memory and sends the advertisement to the visual display.*

*36. A device according to claim 34, further comprising a sequencer for computing a period of time as a function of pre-payment units, and for organizing an advertisement for display only in said period of time.*

*37. An apparatus according to claim 9, wherein said sequencer includes means responsive to display matter read from respective memory zones of plural user cards for multiplexing the display matter on said visual display.*

* * * * *